Patented July 3, 1928.

1,675,840

UNITED STATES PATENT OFFICE.

DELLA BRANDON, OF OAK PARK, ILLINOIS.

SKIN PREPARATION.

No Drawing. Application filed August 14, 1924. Serial No. 731,964.

This invention relates to a skin preparation.

One of the objects of the invention is to provide a novel and improved composition of facial or skin preparation.

A still further object of the invention is to provide an improved skin preparation which has a cleansing effect on the skin.

A still further object of the invention is to provide a preparation which has a composition of ingredients that has an astringent effect in contracting the muscles and thus tending to assist in the elimination of wrinkles.

A still further object of the invention is to provide an improved skin preparation which bleaches the skin and thus tends to the removal of freckles and eruptions therefrom.

My improved skin cleansing composition is applied directly to that portion of the skin that is to be treated as a cream or paste and allowed to remain for a period of time, usually from twenty to forty-five minutes, or even longer, and then may be removed by washing with warm water. The skin will then be found to be in a softened and cleansed condition. It has also been found that my improved composition has healing qualities and is particularly suitable in cases of sunburn.

One way of satisfactorily making my improved skin compound is to mix with a small cake of yeast of the character commonly and commercially sold for bread baking and analogous purposes, or an amount equal to two hundred nineteen grains, a tablespoonfull of peroxide or two hundred twenty-eight grains by weight, and adding to the yeast thus dissolved, the fresh white of one egg or two hundred forty grains, and perfumery, if desired, in any quantity desired and after gently stirring the compound is preferably immediately applied in a thin film over the skin surface to be treated. It will, of course, be understood that the quantity of ingredients may be varied within certain limitations without departing from the scope of my invention. It will also be understood that the compound may be made in various sized quantities according to the requirement. A skin preparation made in accordance with the above formula does not have permanent keeping qualities but will remain in condition for use for a considerable length of time, but is preferably prepared in the form above described for immediate use.

I have used to good advantage in my compound, as set forth herein, the ordinary drug-store peroxide of hydrogen, which I am advised is usually supplied and sold as about a three-percent solution of peroxide of hydrogen with water and a trace of preservative as acetanilid, but a strong solution of peroxide may be used to advantage on some skins. The desirability, and indeed, the necessity of applying my compound to the skin surfaces to be treated in a freshly mixed condition to secure the best results is due to the fact that it is found that the chief bleaching action of the compound is due to the action on the skin of the free oxygen that is liberated by the bacterial action of the yeast on the peroxide of hydrogen, and my tests have shown that the maximum bleaching effect of the free oxygen can only be obtained when it is confined upon the surface of the skin and that this result is secured by reason of the fact that the albumin of the white of egg forms a skin or retaining cover which tends to hold the free oxygen which would otherwise escape as a free gas, in contact with or in proximity to the surface of the skin being treated. The action of the yeast on the peroxide is hastened by moderate heat, as the heat of the body, and such action may be hastened by applying heat after the skin surface is covered with the compound as from a hot towel, an electric heater, and the like. It is found that three treatments of the compound, one each day, for three consecutive days, should be given to most people, and that two treatments each week for a time may be followed by one treatment a week whenever further treatment is needed.

While in the above specification I have described for the purpose of illustration one formula by which my improved skin preparation may be prepared, it will, of course, be understood that slight modifications may be made without respect to the formula without departing from the spirit and scope of my invention as expressed in the following claims.

What I claim as my invention and desire to secure by Letters Patent is:

1. A composition adapted to be used externally as a skin treatment consisting of peroxide of hydrogen, yeast and the white of egg.

2. A skin preparation consisting of a major portion of white of egg, a minor portion of peroxide of hydrogen, and yeast.

3. A skin preparation consisting of a major portion of white of egg, a minor portion of yeast, peroxide of hydrogen, and perfumery.

4. A skin preparation consisting of two hundred forty grains of white of eggs, two hundred twenty-eight grains of peroxide of hydrogen, and two hundred nineteen grains of yeast.

5. A composition for external use in treating the skin consisting of a mixture of peroxide of hydrogen and a substance capable of freeing oxygen from the peroxide in combination with a binder and gas retaining substance.

6. A composition for treating the skin of human beings consisting of a mixture of peroxide of hydrogen and yeast in combination with a binding and gas retaining medium of an albuminous character.

In testimony whereof I have signed my name to this specification on this 23rd day of July, A. D. 1924.

DELLA BRANDON.